(12) United States Patent
Wang

(10) Patent No.: US 6,862,982 B1
(45) Date of Patent: Mar. 8, 2005

(54) FOOD, VEGETABLES AND FRUITS PROCESSOR

(76) Inventor: An-Ting Wang, No. 15, Minzu St. Sinhua Cheng, Tainan Hsien (TW)

(*) Notice: Subject to any disclaimer, the term of this patent is extended or adjusted under 35 U.S.C. 154(b) by 0 days.

(21) Appl. No.: 10/760,311

(22) Filed: Jan. 21, 2004

(30) Foreign Application Priority Data

Nov. 26, 2003 (TW) .................................. 92220897 U

(51) Int. Cl.[7] .......................... A23N 1/00; A23N 1/02; A47J 43/046; A47J 43/07; A23L 1/00
(52) U.S. Cl. ......................................... 99/511; 99/513
(58) Field of Search .................. 99/492, 495, 509–513; 366/291, 297–300, 314, 601; 241/37.5, 92, 282.1, 282.2; 494/36, 37, 43, 47, 10, 85; 426/61, 63, 52, 533, 599, 231, 640, 233

(56) References Cited

U.S. PATENT DOCUMENTS

| | | | | |
|---|---|---|---|---|
| 2,844,176 A | * | 7/1958 | Barrows et al. | ......... 241/188.1 |
| 3,085,606 A | * | 4/1963 | Moline | ......................... 99/511 |
| 4,506,601 A | * | 3/1985 | Ramirez et al. | ............. 99/511 |
| 5,222,430 A | * | 6/1993 | Wang | .......................... 99/512 |
| 5,257,575 A | * | 11/1993 | Harrison et al. | .............. 99/511 |
| 5,355,784 A | * | 10/1994 | Franklin et al. | ............... 99/492 |
| 5,392,699 A | * | 2/1995 | Tai | ............................... 99/492 |
| 5,417,152 A | * | 5/1995 | Harrison | ...................... 99/492 |
| 5,924,357 A | * | 7/1999 | Chen | ........................... 99/511 |
| 6,058,833 A | * | 5/2000 | Ling et al. | ..................... 99/510 |
| 6,202,547 B1 | * | 3/2001 | Tseng et al. | .................. 99/511 |
| 6,543,340 B1 | * | 4/2003 | Fouquet | ....................... 99/511 |
| 6,609,455 B2 | * | 8/2003 | Fouquet | ....................... 99/511 |

* cited by examiner

*Primary Examiner*—Timothy F. Simone
(74) *Attorney, Agent, or Firm*—Troxell Law Office, PLLC

(57) ABSTRACT

A peeling, grinding, breaking and blending device for food, vegetables and fruits, it comprise a lower cover having a receiving room, a base provided under the lower cover, a cutting and grinding portion and an upper cover used to cover the lower cover. The cutting and grinding portion is received in the receiving room of the lower cover, a cutting, peeling and grinding plate is provided on the upper end of the cutting and grinding portion, a plurality of toothed knives are provided with the surface of the cutting, peeling and grinding plate, a grinding layer is provided at the surrounding portion thereof, a through hole is provided on the upper cover, the bottom of the through hole is provided with a grinding layer, a stopper layer is provided with the grinding layer, thus, when the vegetables and fruits are placed in through the through hole, the functions of juice squeezing and grinding can be proceeded at the same time. The device is applicable to use as a food processor having the twin functions of squeezing juice and grinding food.

7 Claims, 8 Drawing Sheets

FOOD, VEGETABLES AND FRUITS PROCESSOR

BACKGROUND OF THE INVENTION

1. Field of the Invention

The present invention is related to a peeling, grinding, breaking and blending device for food, vegetables and fruits, and especially to such a device which can save storage space and simplify operation procedure, and is applicable to use as a food processor having the twin functions of squeezing juice and grinding food.

2. Description of the Prior Art

Following advancing of times, especially progressing development in industry and commerce and high development of earth, people need much more energy for their work, and yet get less and less physical exercises. As a result, they gradually feel degradation of their body functions that threats their health. The importance of exercise, hence are not only deeply recognized, but the nutrition provided by food and beverages are also more required.

In the eating and drinking respect, balance is very important; in view of this, there have been various food processors for grinding food and for squeezing juice in order that people can obtain nutritious supplements from them quickly. However, the principle of a common food processor is to have food chopped and blended by high speed turning of cutting knives. Thereby, after high speed cutting, nutrition in the food are rapidly oxidized and thereby lost; and if the fibers in the food are too coarse, they are hard to be absorbed by a human body even after the food are grinding and breaking. Such food processors thereby are undesired.

And more, a conventional food processor such as the food processor 1 depicted in FIGS. 1 and 2, includes a set of elements 2 and two different sets of cooperating cutting combinations (3, 4), they can cut vegetables and fruits with low speeds, and can grind foods and beans with coarser fibers, this food processor though has a variety of functions to use, it has the following flaws:

1. The food processor has numerous members in combinations in order to get various functions; it needs quite a large storage space.
2. When in using a different function, the structure assembled from the members must be dismantled before mounting another set of elements; the dismantling and mounting work is quite time consuming when in need of such changing of function.
3. The food processor does not have the function of grinding when in cutting vegetables and fruits as well as in juice squeezing, the nutrition in the fruit peels and seeds can not be released, this make a large loss in nutrition taking.
4. In grinding bean foods, the food processor is having an upper set of grinding teeth and a lower set of grinding teeth able of engaging with each other directly to grind; when in use, due to the lager granules of the beans, they are hard to enter the grinding area, and if the beans are put first before turning on the food processor, it will be easy to make the upper and lower sets of grinding teeth blocked and not be able to operate. This not only makes a user inconvenient, but also makes the operating motor fail or even burn down to induce danger.

In order to overcome the above flaws, the food processor of the present invention with its members simplified is developed by the inventor based on his professional experience of years and continuous studying.

SUMMARY OF THE INVENTION

The primary objective of the present invention is to provide a peeling, grinding, breaking and blending device for food, vegetables and fruits, it allows performing twin functions of cutting and grinding at the same time, and can avoid blocking and inability of operating of the upper and lower sets of grinding teeth due to the overly large granules of the beans.

The secondary objective of the present invention is to provide a peeling, grinding, breaking and blending device for food, vegetables and fruits, it allows direct changing for another set of elements without dismantling the entire structure when in performing different work from one to the other between juice squeezing from vegetables and fruits and grinding of beans, thus different functions can be performed easily.

A further objective of the present invention is to provide a peeling, grinding, breaking and blending device for food, vegetables and fruits, the upper end of a connecting portion of its base and the base of the cutting and grinding portion are magnetically attracted with each other, therefore when the base of the cutting and grinding portion are mutually embedded with the connecting portion, it allows the base of the cutting and grinding portion and the base connect tightly. With the function of one-directional bearing, it will allow the cutting and grinding portion to separate from the connecting portion of the base easier, and to avoid danger induced by over-rotation of the device.

To achieve the above stated objectives of the present invention, the peeling, grinding, breaking and blending device for food, vegetables and fruits of the present invention comprises: a base, a lower cover, a cutting and grinding portion and an upper cover. The base is provided therein with an operating motor, and is provided on the upper end thereof with a connecting portion rotatable synchronically with the operating motor. The lower cover is mounted on the base and has a receiving room. The lower cover is provided with a juice outlet. The cutting and grinding potion is connected with the connecting portion provided on the upper end of the base for synchronic rotation with the operating motor. The cutting and grinding portion is provided on the upper surface with a cutting, peeling and grinding plate. Inside thereof the cutting, peeling and grinding plate is provided with a plurality of toothed knives, and peripherally therewith a grinding layer. The upper cover covers the lower cover, and is provided with a through hole extending therethrough downwardly from above, the through hole has on the bottom thereof an annular grinding layer. Inside thereof the annular grinding layer is provided with a stopper layer.

Thereby when squeezing juice, the fruits and vegetables are placed in through the through hole of the upper cover, the toothed knives of the cutting, peeling and grinding plate perform cutting, and the grinding layer provided peripherally thereof the cutting, peeling and grinding plate performs grinding together with the annular grinding layer of the upper cover; when in grinding food, the speed of placement of the food is retarded by the stopper layer in favor of direct cutting and grinding.

The present invention will be apparent after reading the detailed description of the preferred embodiment thereof in reference to the accompanying drawings.

DETAILED DESCRIPTION OF THE PREFERRED EMBODIMENT

Figure 1:
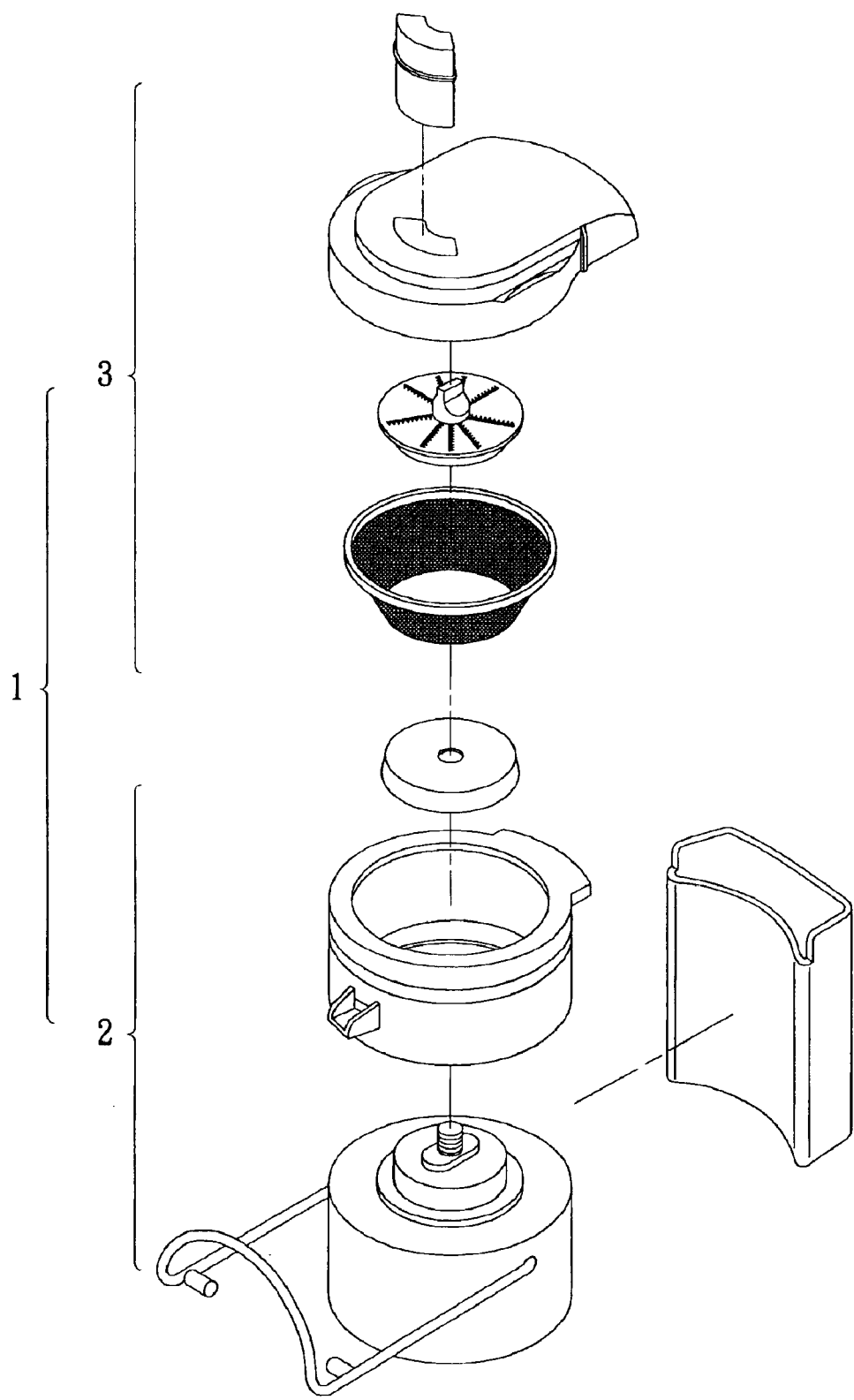
FIG. 1 is an exploded perspective view of an embodiment of a conventional food processor.
Figure 2:
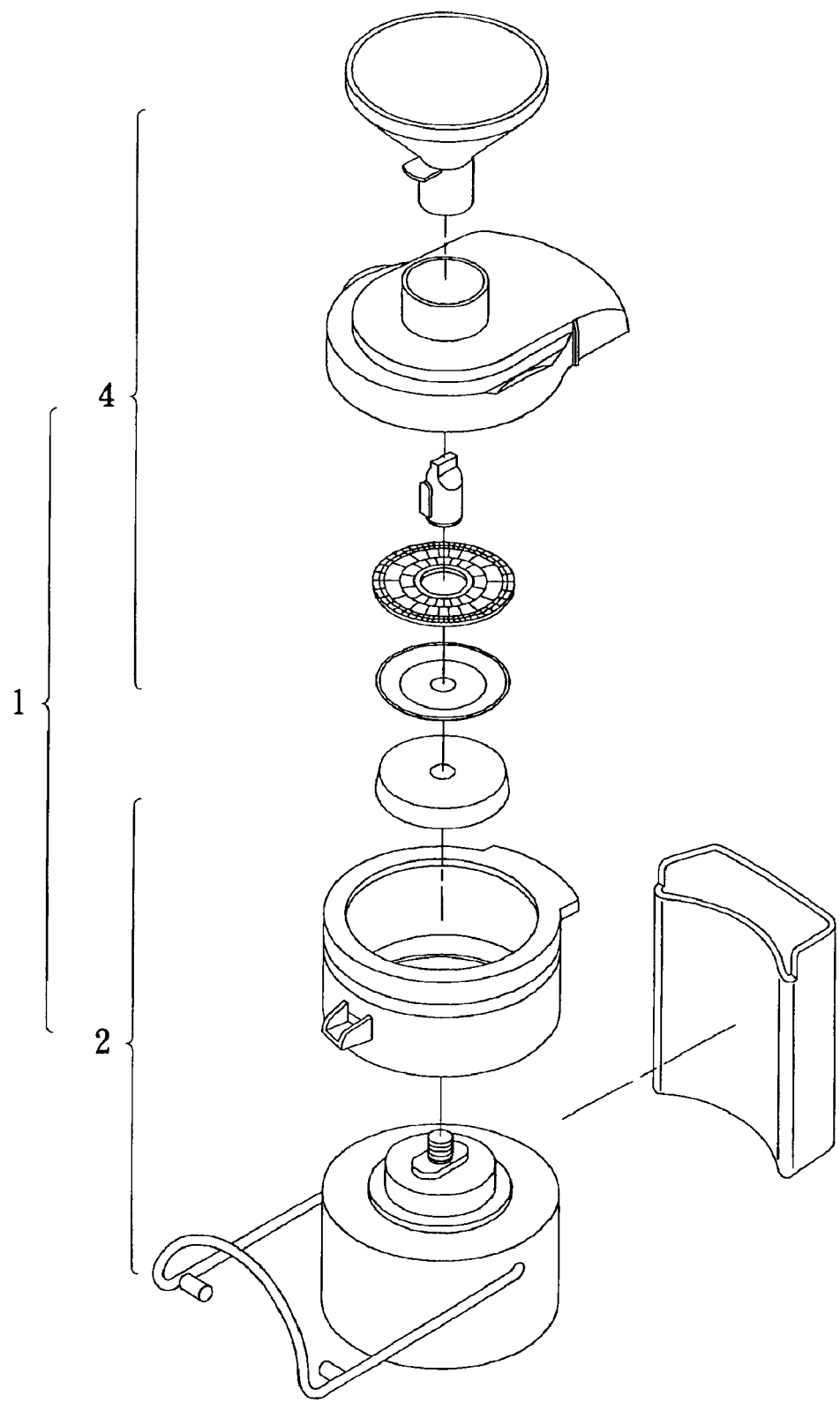
FIG. 2 is an exploded perspective view of an embodiment of another conventional food processor.

Referring firstly to FIGS. 3–7 depicting a most preferred embodiment of a peeling, grinding, breaking and blending device 10 for food, vegetables and fruits of the present invention, the present invention comprises: a base 20, a lower cover 30, a cutting and grinding portion 40, an upper cover 50, a first combination set 60 and a second combination set 70.

Figure 6:
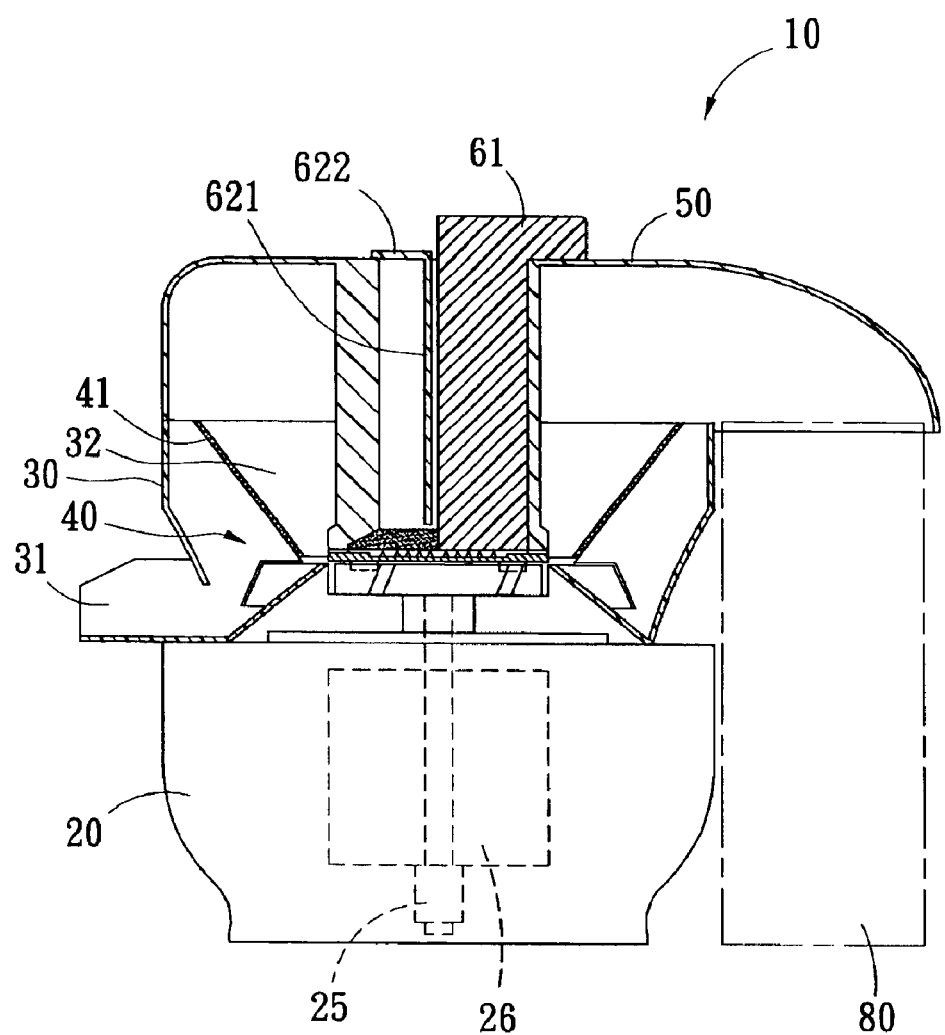
FIG. 6 is a sectional view showing use of the embodiment of the present invention.
Figure 7:
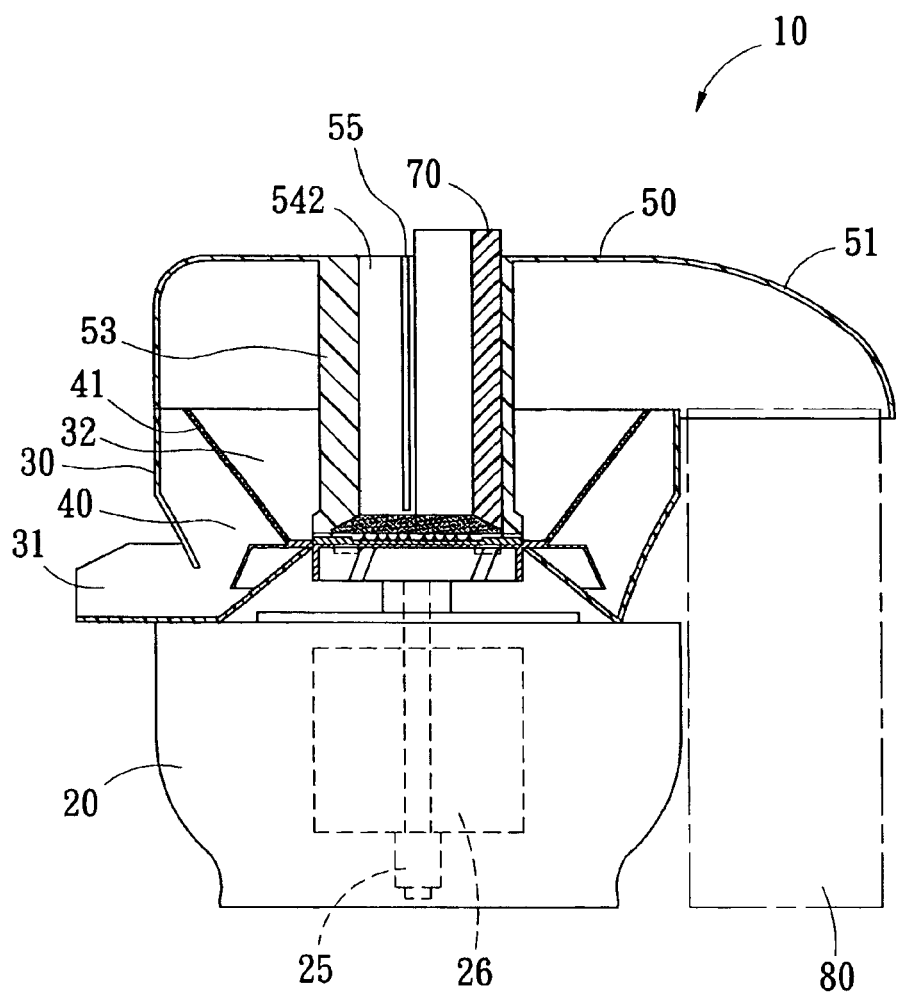
FIG. 7 is a sectional view showing another mode of use of the embodiment of the present invention.

The base 20 is in the shape of a cylinder having a narrower bottom portion. It is provided on the upper end peripherally thereof with a movably arranged engaging member 21, and is provided therein with an operating motor 26 (as shown in FIG. 6). The operating motor 26 is provided on the upper end therewith a connecting portion 22 that is synchronically rotatable with the operating motor 26. The connecting portion 22 is protruded out from the upper end of the base 20 and is provided peripherally with a plurality of inclined slots 23. The upper end of the connecting portion 22 is provided with at least a magnet 24 (there are four magnets provided in the embodiment). Further, at the bottom of the central portion of the axle of the operating motor 26 is connected to a one-directional bearing 25. The one-directional bearing 25 is fixed on the bottom of the base 20.

The lower cover 30 is mounted on the base 20. It is provided with a juice outlet 31 and has therein a receiving room 32.

Figure 5:
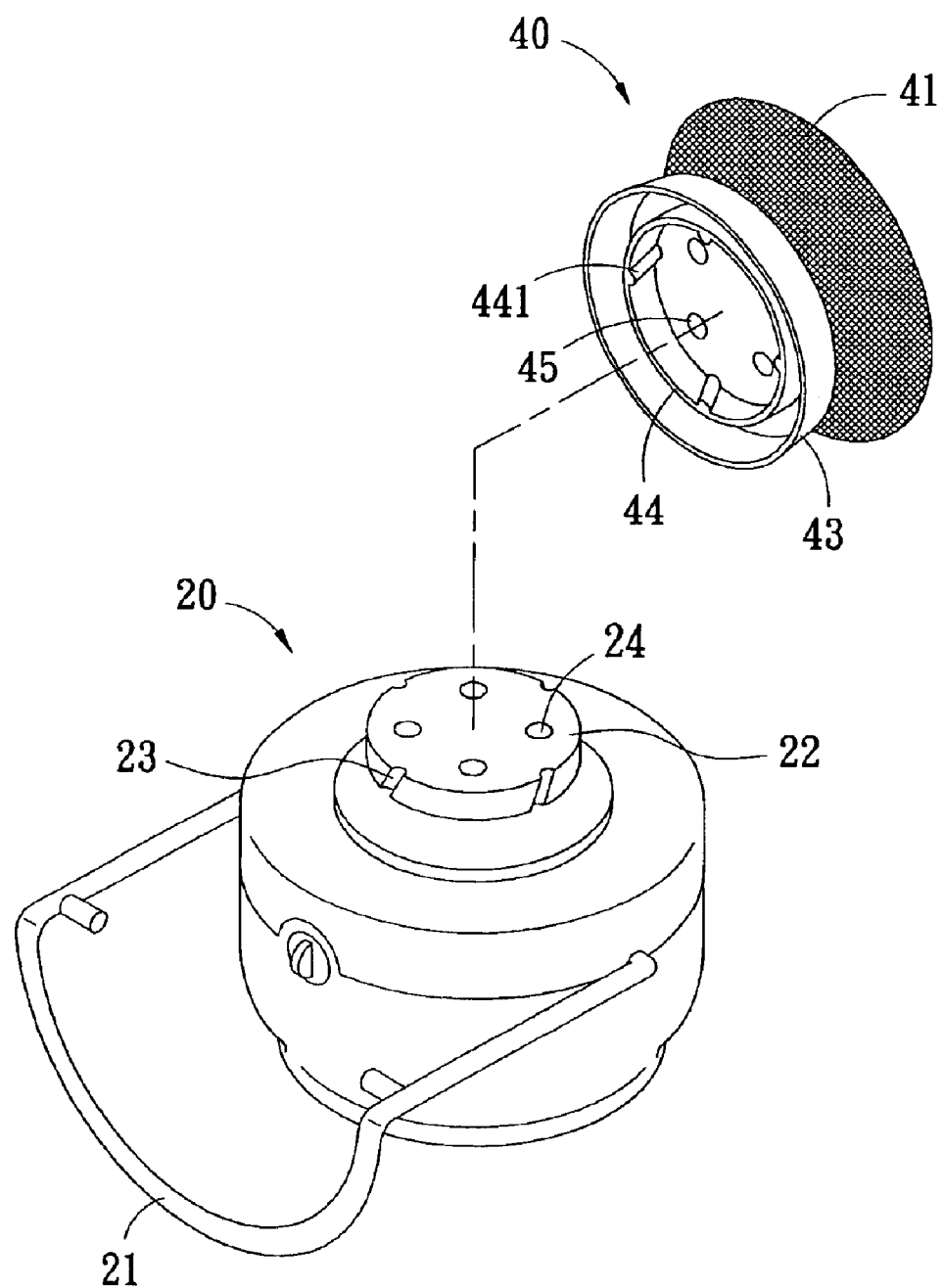
FIG. 5 is an exploded perspective view showing the cutting and grinding disk and the base.

The cutting and grinding portion 40 includes a filter 41, a cutting, peeling and grinding plate 42, a cover basin 43 used for preventing the leaking of the juice caused by cutting, peeling and grinding and a sleeve portion 44 provided at the bottom of the cutting and grinding portion 40 (as shown in FIG. 5). The cutting and grinding portion 40 is received within the receiving space 32 of the lower cover 30. The cutting, peeling and grinding plate 42 is provided at the upper end of the cutting and grinding portion 40, and is surrounding by the filter 41. The cutting, peeling and grinding plate 42 is provided on the upper surface thereof with a plurality of toothed knives 411 arranged equidistantly around within the cutting, peeling and grinding plate 42. The surrounding portion of toothed knives 411 is served as a grinding layer 412. The sleeve portion 44 is an annular sleeve and is provided within with a plurality of rib-like portions 441 arranged equidistantly. When the cutting and grinding portion 40 is rotated downwardly, the said rib-like portions 441 are connected with the inclined slots 30 of the connecting portion 22 on the upper end of the base 20. The bottom of the cutting and grinding portion 40 is provided at least with a magnetic member 45 that can be magnet or iron metal (there are four in this embodiment). When the rib-like portions 441 of the cutting and grinding portion 40 are connected with the inclined slots 23 of the connecting portion 22 on the base 20, it allows the cutting and grinding portion 40 with the connecting portion 22 on the base 20 to connect tightly due to the duple connection strength. Thus, when the device in the grinding condition, it will have enough duration power to sustain the stop force incurred within the grinding. When the cutting and grinding portion is rotated upwardly, with the function of the one-directional bearing 25, it can fix the connecting portion 22 on the upper end of the operation motor 26 and make it unable to move, thus, the cutting and grinding portion 40 is easily to separate from the connecting portion 22 and to further release from the base 20.

Figure 3:
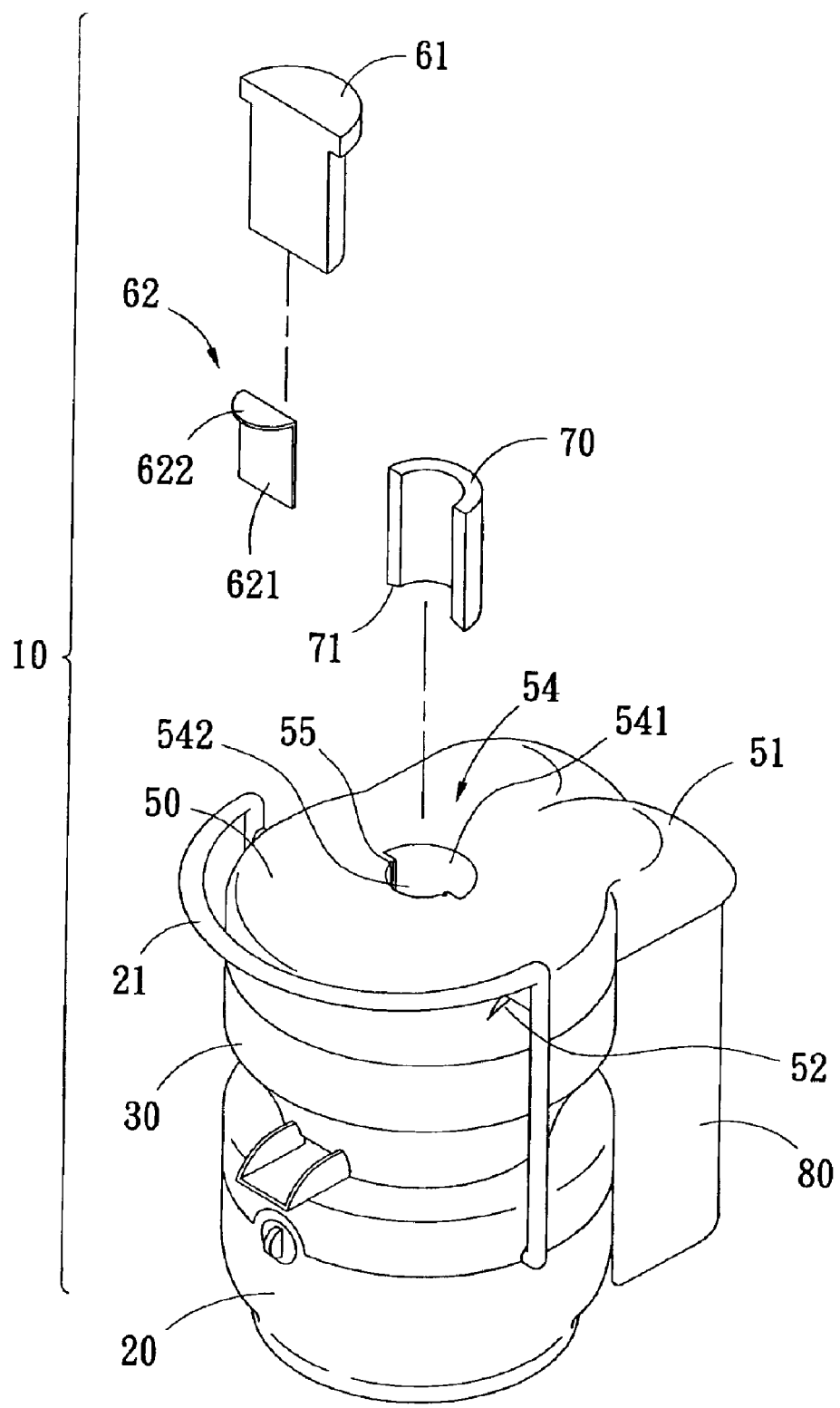
FIG. 3 is a perspective view showing the outlook of a nearly completely assembled embodiment of the present invention.
Figure 4:
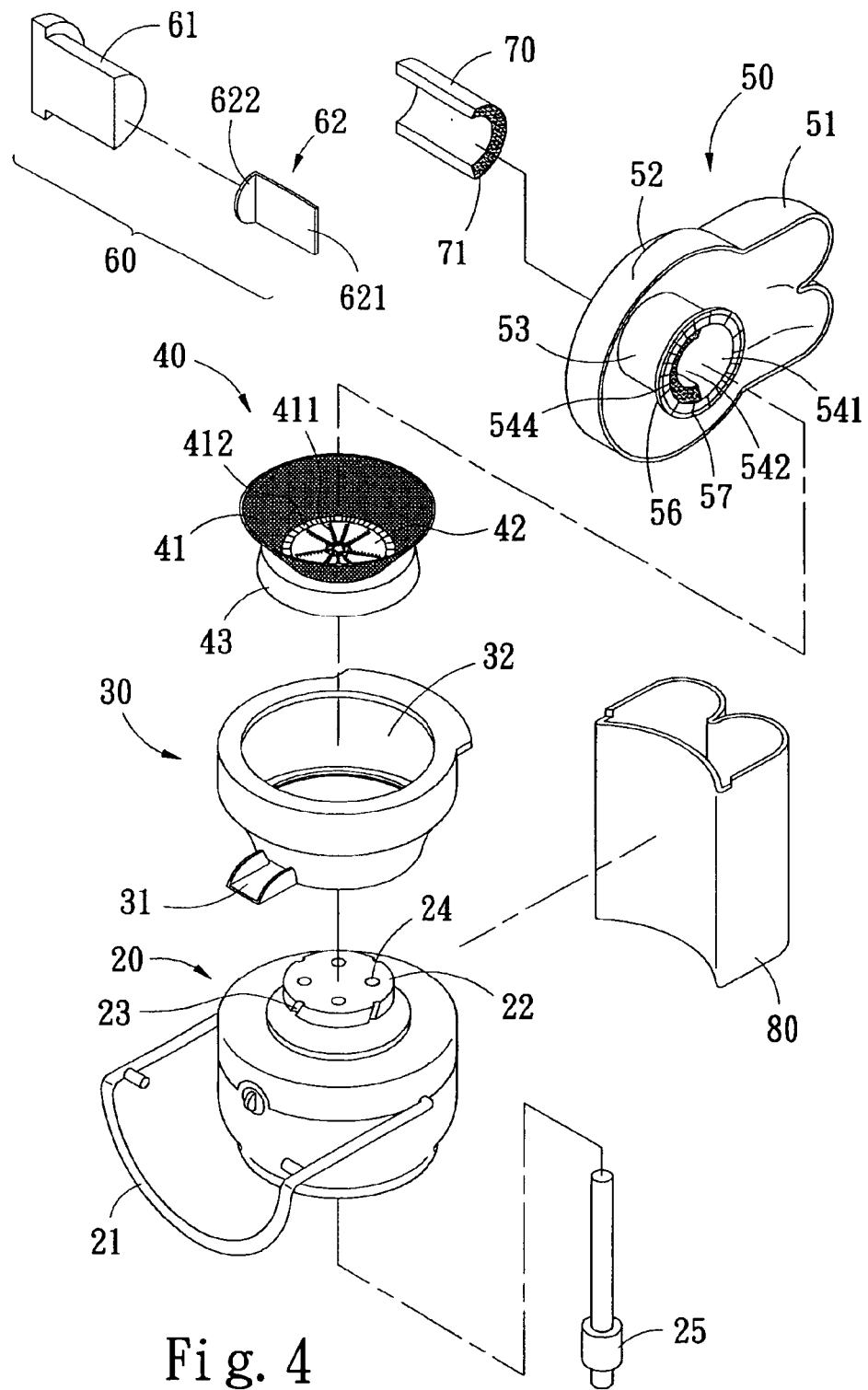
FIG. 4 is an exploded perspective view of the embodiment of the present invention.

The upper cover 50 covers the lower cover 30. It is extended outwardly toward one side thereof to form two arciform protrusions 51, and is provided on two lateral sides thereof with two symmetrically arranged arciform engaging members 52 for engaging with the engaging member 21 of the base 20. The engagement will make the base 20, the lower cover 30 and the upper cover 50 combine as a set. The upper cover 50 in the middle of its bottom is provided with a pipe 53 protruding outwardly. The pipe 53 is provided therein with a through hole 54 extending therethrough downwardly from above. The through hole 54 is formed with a large semi-circle 541 and a small semi-circle 542. The latter is provided on its lateral sides with connecting grooves 55 (as shown in FIG. 3). The pipe 53 is protruded outwardly to form an annular flange 56. The bottom end of the annular flange 56 is provided with an annular grinding layer 57. And a stopper layer 544 near the outer portion of the bottom of the small semi-circle 542 is provided within the annular grinding layer 57. The stopper layer 544 is in an up-inwardly cone shape.

The first combination set 60 includes a stuff pusher plunger 61 and a shielding plate 62. The shielding plate 62 is an L shape thin plate and has vertical portion 621 and horizontal portion 622. The said vertical portion 621 can be inserted into the grooves 55 provided on the lateral sides of the small semi-circle 542 of the through hole 54. This can allow the horizontal portion 622 of the shielding plate 62 to shield the inner space of the small semi-circle 542 and the stuff pusher plunger 62 can fit in the large semi-circle 541 of the upper cover 50.

The second combination set 70 can be used alternately with the first combination set 60. The said second combination set 70 is a semi-cylinder and its bottom is provided with a upwardly cone shape stopper layer 71. When the said second combination set 70 is pushing into the large semi-circle 541 of the through hole 54, the stopper layer 71 of the second combination set 70 with the stopper layer 544 on the bottom of the upper cover 50 will form a round cone surface to retard the speed of placement of the food, thus, the grinding work can be smooth.

Figure 8:
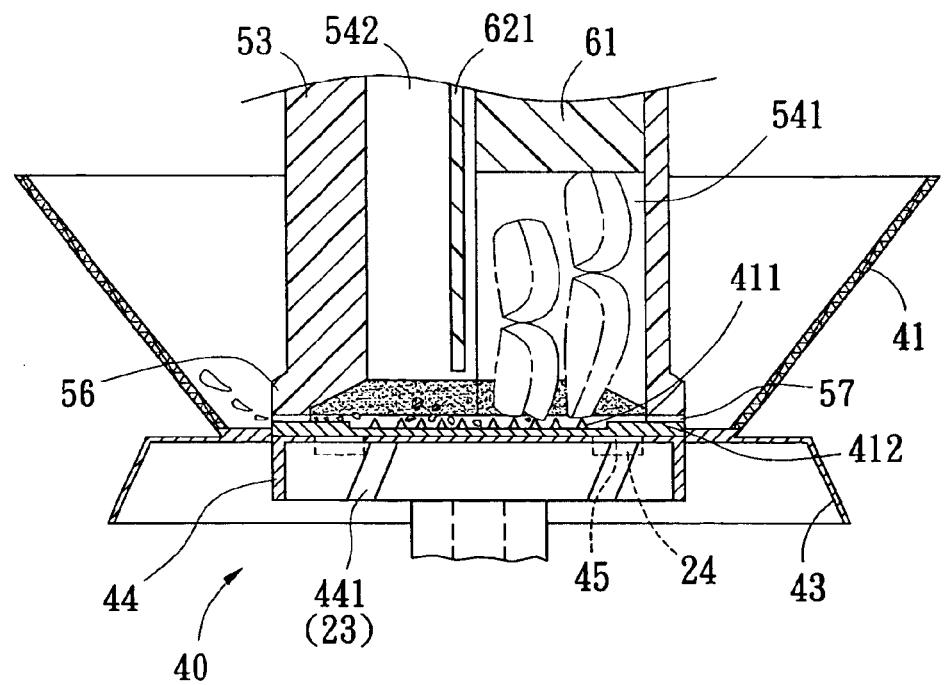
FIG. 8 is a schematic sectional view showing use of the present invention in juice squeezing from vegetables and fruits.

Referring to FIG. 8, when using the function of squeezing juice, vegetables and fruits are placed in through the large semi-circle 541 of the through hole 54 of the upper cover 50, and are being pressed downwardly by the stuff pusher plunger 61. Then the toothed knives 411 of the cutting, peeling and grinding plate 42 perform cutting and peeling to make the vegetables and fruits fine shreds and juice. The grinding layer 411 provided surrounding the toothed knives 412 performs grinding together with the annular grinding layer 57 of the upper cover 50, thereby the fine shreds are once more processed to render the finally obtained juice to pass the filter 41 and flow out from the juice outlet 31, while the coarse fibers that are hard to be absorbed by human bodies are sprayed into a dregs receiver 80 for collection.

Figure 9:
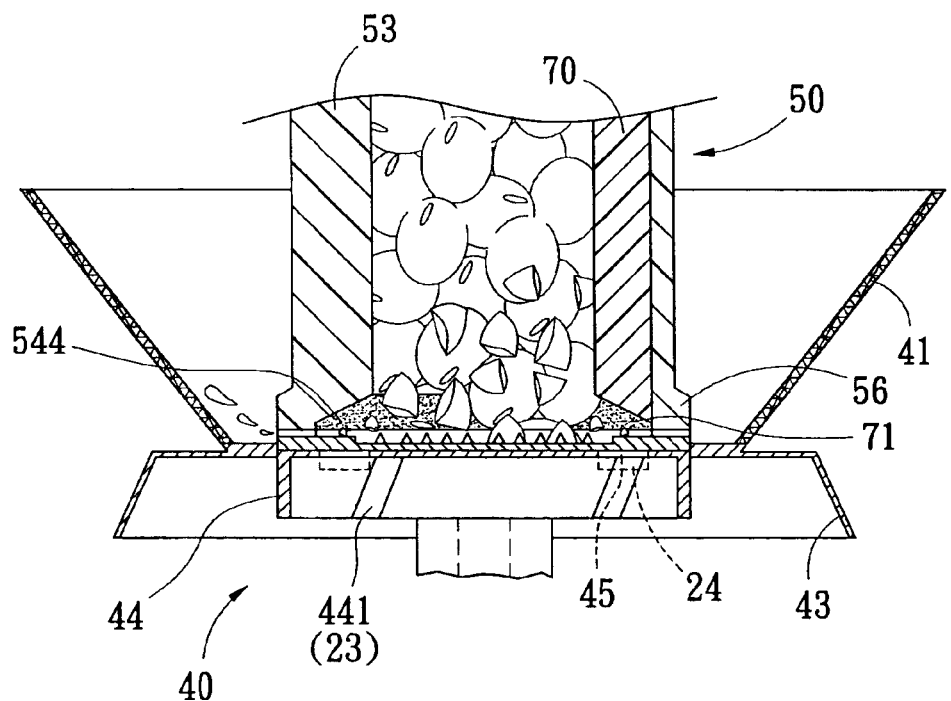
FIG. 9 is a schematic sectional view showing use of the present invention in food grinding.

When in grinding food (such as soy beans), the second combination set 70 is placed from above the upper cover 50 to take the place of the first combination set 60. When the second combination set 70 is placed into the large semi-circle 541 of the through hole 54, the food is placed in through the round hole formed by the small semi-circle 542 and the second combination set. And by the stopper layer 71 of the second combination set with stopper layer 544 provided on the bottom of the upper cover 50, the speed of displacement of the food is therefore retarded, and the food can be cut into fine shreds, then be again ground (as shown in FIG. 9).

The present invention thereby has the following advantages:

1. The present invention performs cutting and peeling by using toothed knives provided on the inner side of the cutting, peeling, and grinding plate of the cutting and grinding portion and performs grinding by using the grinding layer of the surrounding portion of the cutting, peeling and grinding plate; no matter the vegetables and fruits are to be squeezed out juice or the beans are to be ground, the vegetables and fruits can be cut into fine shreds and then ground, this not only can substantially release the nutrition of them, but also can avoid blocking of the grinding layers due to the overly large granules of the beans during grinding.
2. The present invention allows direct changing of the first combination set and the second combination set from the upper end of the upper cover for different use of juice squeezing and beans grinding respectively without dismantling the entire structure, thus operation of changing members is simplified, and components are simplified too to effectively reduce the storage space
3. The present invention discloses a structure having at least a magnet provided on the upper end of the connecting portion of the base, and at least a magnetic member provided on the bottom of the cutting and grinding portion for the magnet to attract; and further when the rib-like portions are connected with the inclined slots of the connecting portion, it will allow the cutting and grinding portion and the connecting portion of the base connect tightly due to duple connecting strength. When the cutting and grinding portion is rotated upwardly, with the function of the one-directional bearing, it can fix the connecting portion on the upper end of the operation motor and make it unable to move, thus, the cutting and grinding portion is easily to separate from the connecting portion and to further release from the base, to avoid the danger caused by over-rotation In conclusion, the present invention can get the expected objectives thereof to provide to a peeling, grinding, breaking and blending device for food, vegetables and fruits, which device can save storage space, simplify operation procedure, and has the twin functions of juice squeezing and grinding.

Having thus described my invention, what I claim as new and desire to be secured by Letters Patent of the United States are:

1. A peeling, grinding, breaking and blending device for food, vegetables and fruits, said device comprises
   a base provided therein with an operating motor and provided on an upper end thereof with a connecting portion rotatable synchronically with said operating motor;
   a lower cover mounted on said base and having a receiving room, said lower cover is provided with a juice outlet;
   a cutting and grinding portion connected with said connecting portion provided on said upper end of said base for synchronic rotation with said operating motor, said cutting and grinding portion is provided on an upper surface therewith a cutting, peeling and grinding plate, said cutting, peeling and grinding plate is provided with a plurality of toothed knives, and further at the surrounding portion of said toothed knives is provided with a grinding layer, and
   an upper cover used for covering said lower cover and provided with a through hole extending therethrough downwardly from above, said through hole has on the bottom thereof an annular grinding layer, a stopper layer is provided with the grinding layer;
   thereby when squeezing juice, the fruits and vegetables are placed in through the through hole of the upper cover, the toothed knives of the cutting, peeling and grinding plate perform cutting, and the grinding layer provided peripherally thereof the cutting, peeling and grinding plate performs grinding together with the annular grinding layer of the upper cover; when in grinding food, the speed of placement of the food is retarded by the stopper layer in favor of direct cutting and grinding.

2. The device as described in claim 1, wherein said through hole of upper cover is formed with a large semi-circle and a small semi-circle; said device further include a first combination set and a second combination set, the two combination sets can be selected for use and being placed in the through hole of the upper cover; said first combination set includes a shielding plate and a stuff pusher plunger, said shielding plate can be fitted into the small semi-circle of the through hole to shield the inner space of the said small semi-circle; said second combination set is a semi-cylinder, its bottom is provided with a cone shape stopper layer, said combination set can be pressed into the large semi-circle of the through hole to retard the speed of the placement of the food for the smooth grinding work.

3. The device as described in claim 1, wherein said small semi-circle of the through hole of the upper cover is provided with connecting grooves corresponding to the shielding plate of the said first combination set, to allow the shielding plate to fit in and be connected.

4. The device as described in claim 1, wherein said stopper layer of the bottom of the upper cover is in an up-inwardly cone shape.

5. The device as described in claim 1, wherein said cutting and grinding portion further include a filter, a cover basic to prevent the juice leaking caused by the cutting, peeling and grinding work, and a sleeve portion provided at the bottom of the cutting and grinding portion; said sleeve portion is an annular sleeve and is provided within with a plurality of rib-like portions arranged equidistantly; said connecting portion of the base is provided with inclined slots used to be connected with the said rib-like portion.

6. The device as described in claim 1, at the upper end of said connecting portion of said base is provided with at least a magnet and on the bottom of said cutting and grinding portion is provided with at least a magnetic member for said magnet to attract, thus, the cutting and grinding portion and the connecting portion of the base can connect tightly.

7. The device as described in claim 1, said base further includes a one-directional bearing, said bearing is fixed with the axle of the operating motor at the central portion of the bottom of said base.

* * * * *